3,169,144
ANTICHOLESTERINEMIC AND ANTILIPAEMIC AGENTS

Guido Cavallini and Elena Massarani, Milan, Italy, assignors, by mesne assignments, to Elena Massarani, Milan, Italy
No Drawing. Filed Sept. 30, 1960, Ser. No. 59,502
Claims priority, application Italy, Aug. 12, 1960, 14,356
6 Claims. (Cl. 260—520)

This invention is concerned with certain novel derivatives of synthetic estrogens. In particular it is concerned with certain novel derivatives of stilbestrol and hexestrol which are hormonally inactive and useful as anticholesterinemic agents.

The compounds of this invention comprise free acids of the following generic formula:

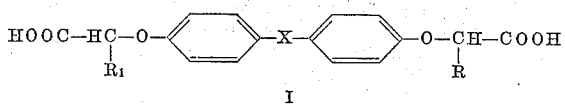

I and metal salts, esters and amides thereof, in which X is selected from the group consisting of

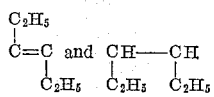

$R^1$ has the same meaning as R and R represents a lower hydrocarbon radical containing from 1 to 8 carbon atoms which radical may be straight or branched and may be saturated or unsaturated. Advantageously the "lower hydrocarbon radicals" may be alkyl radicals, straight or branched, of 1 to 5 carbon atoms inclusive.

The corresponding esters of this invention are represented as follows:

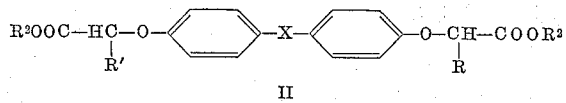

II wherein the terms X, R and R' have the meaning defined above and $R^2$ represents an alkyl radical containing from 1 to 4 carbon atoms, inclusive. The metal salts are advantageously those containing a pharmaceutically acceptable metal anion, such as di-alkali metal or alkaline earth metal salts, for example sodium, potassium, calcium and magnesium salts.

Preferred compounds of this invention are 4,4'-bis-($\alpha,\beta$-diethylstilbene)-hydroxy-$\alpha$-propionic acid, 4,4'-bis-($\alpha,\beta$-diethylstilbene)-hydroxy-$\alpha$-butyric acid, 4,4'-bis-($\alpha,\beta$-diethylstilbene)-hydroxy-$\alpha$-isocaproic acid, their dihydro-analogs, salts, esters and amides thereof.

These compounds are the first derivatives of synthetic estrogens of practical utility as anticholesterinemic agents, since they are capable of lowering serum lipids and cholesterol levels without producing feminizing side effects.

It is known that estrogens, natural and synthetic, show a favourable effect on serum cholesterol and lipids, and produce shifts in blood lipids. For their antilipaemic activity, estrogens have been used, for example, in the treatment of atherosclerosis, but their usefulness is greatly limited by undesirable side effects, especially when they are given in large doses which are on the other hand necessary to assure normalization of serum lipids. Estrogens cause loss of libido and potentia in the male, and uterine bleeding in the female.

It has been now found that the ether acids of diethylstilbestrol and hexestrol, corresponding to Formula I above, and the metal salts, esters and amide thereof have a high activity on serum lipids and cholesterol and no significant estrogenic action, as determined by animal assay.

The compounds are active via oral administration and they can be formulated in any suitable manner but are preferably administered in association with a nontoxic, solid or liquid, pharmaceutical carrier, suitable for oral ingestion. If a solid carrier is used the preparation may take the form of tablets, linguets, powders, capsules, prepared by standard pharmaceutical techniques. If a liquid carrier is used, the preparation may be in the form of a gelatin capsule, a syrup or a liquid suspension.

The 4,4'-bis-($\alpha,\beta$-diethylstilbene) hydroxy lower $\alpha$-aliphatic carboxylic acids and their dihydro-analogs of the present invention can be readily prepared by condensing diethylstilbestrol or hexestrol with an $\alpha$-halo substituted lower alkyl ester of a lower aliphatic carboxylic acid in the presence of sodium alkoxide, for instance sodium ethoxide, and hydrolyzing, if desired, the resulting diester to the free di-acid.

Representative esters which can be employed herein include the following: $\alpha$-bromoethyl propionate, $\alpha$-bromo ethyl butyrate, $\alpha$-bromo ethyl valerate, $\alpha$-bromo ethyl isovalerate, $\alpha$-bromo ethyl caproate, $\alpha$-bromo ethyl isocaproate, $\alpha$-bromo ethyl oenanthate, $\alpha$-bromo ethyl vinylacetate and the corresponding $\alpha$-bromo methyl esters.

The metal salts of the acids of Formula I are prepared by treatment of the acid with the appropriate metal hydroxide according to standard procedures for acid salt formation.

The di-esters are in general obtained as intermediates in the preparation of the corresponding acids. Alternatively esters can be prepared by refluxing the free acids with an excess of the alcohol in the presence of an acid condensing agent, such as hydrogen chloride and sulfuric acid, according to the Fisher esterification method.

If the diester is subjected to ammonolysis according to standard procedures the corresponding di-amide is promptly obtained.

The following examples are illustrative of the new products of the present invention but are not to be construed as limiting.

EXAMPLE 1

In a two-necked flask, equipped with a mechanical stirrer and a reflux condenser, 13.4 g. of diethyl stilbestrol (0.05 mole) were dissolved in a sodium ethoxide solution, prepared from 2.3 g. (0.1 mole) of metallic sodium and 65 cc. of anhydrous ethanol. 18.1 g. of $\alpha$-bromo ethyl propionate (0.1 mole) were added and the mixture was refluxed for two hours. After cooling, the mixture was diluted with water and extracted with ether. The ether solution was dried and the solvent removed in vacuo. The residual oil taken up with a little ether and scratched gave a solid product consisting of 4,4'-bis-($\alpha,\beta$-diethylstilbene)-hydroxy-$\alpha$-propionic acid diethyl-ester. Yield 17.5 g.

A mixture of 15 g. of diethyl ester, 50 cc. of 10% aqueous sodium hydroxide solution and 30 cc. of ethanol was refluxed for about half an hour. The alcohol was evaporated, the mixture diluted with water, acidified and extracted with ether. The ethereal extract was washed with water, dried over sodium sulfate and concentrated in vacuo. The residue, crystallized from diluted acetic acid gives 4,4'-bis-($\alpha,\beta$-diethylstilbene)-hydroxy-$\alpha$-propionic acid melting at 220–222° C.

*Analysis.*—Calc. for $C_{24}H_{28}O_6$: C, 69.88; H, 6.84. Found: C, 69.27; H, 7.01.

EXAMPLE 2

A solution of 1.3 g. of 4,4'-bis-($\alpha,\beta$-diethylstilbene)-hydroxy-$\alpha$-propionic acid in 15 cc. of ether was treated with 0.36 g. of sodium hydroxide (two equivalents) dissolved in 10 cc. of wataer. The aqueous layer was separated, washed with ether and evaporated to dryness to give di-sodium 4,4-bis-(α,β-diethylstilbene) hydroxy-α-propionate. Similarly, by employing equivalent amounts of other alkali metal or alkaline metal hydroxides the corresponding salts of 4,4'-bis(α,β-diethylstilbene) hydroxy-α-propionic acid were obtained, including the potassium, calcium and magnesium salts.

EXAMPLE 3

A mixture of 7.7 g. of diethylstilbestrol, 2.7 g. of sodium methylate and 45 cc. of anhydrous methanol was treated with 10.5 g. of α-bromo methyl-propionate. The mixture processed as in Example 1 gave 4,4'-bis-(α,β-diethylstilbene)-hydroxy-α-propionic acid dimethyl ester.

A solution of 1.8 g. of this compound in 20 cc. of methanol was treated at about 0.5° C. with an excess of aqueous ammonia. The solution was concentrated and cooled to give 4,4'-bis-(α,β-diethylstilbene)-hydroxy-α-propionic acid amide as a white crystalline product.

EXAMPLE 4

6 g. of 4,4'-dihydroxy-α,β-diethyldiphenylethane (hexestrol) were dissolved in 25 cc. of anhydrous ethanol containing 2.2 g. of sodium ethylate while a solution of 8.2 g. of α-bromo-ethylpropionate in 20 cc. of anhydrous ethanol was added dropwise. The mixture was refluxed for two hours, then cooled. A solution of 1.5 g. of potassium hydroxide in 15 cc. of water was added and the mixture refluxed again for half an hour. Ethanol was then removed by distillation and the residual solution acidified with 15% hydrochloric acid and extracted with ether. After elimination of the solvent a residue was obtained consisting of 4,4'-bis-(α,β-diethyldiphenylethane)-hydroxy-α-propionic acid. The product crystallized from diluted acetic acid shows melting point 230° C. Yield 49%.

*Analysis.*—Calc. for $C_{24}H_{30}O_6$: C, 69.54; H, 7.30. Found: C, 69.26; H, 7.23.

By treating 1.5 g. of the di-acid with 0.41 g. of sodium hydroxide as in Example 2, there is obtained the corresponding sodium salt of 4,4'-bis-(α,β-diethyldiphenylethane)-hydroxy-α-propionic acid.

EXAMPLE 5

Metallic sodium (1.5 g.) was added continuously in small pieces to 40 cc. of anhydrous ethanol and to the resulting solution 7 g. of diethylstilbestrol and 10.5 g. of α-bromoethylbutyrate were added. The mixture processed as in Example 4 furnished 4,4'-bis-(α,β-diethylstilbene) hydroxy-α-butyric acid melting at 195° C., after recrystallization from a mixture of ethyl acetate and petroleum ether. Yield 62%.

*Analysis.*—Calc. for $C_{26}H_{32}O_6$: C, 70.88; H, 7.32. Found: C, 70.35; H, 7.79.

EXAMPLE 6

From the reaction of diethylstilbestrol and α-bromomethylbutyrate as in Example 3, the intermediate 4,4'-bis-(α,β-diethylstilbene)-hydroxy-α-butyric acid dimethyl ester was obtained. A solution of 2 g. of the diester in 20 cc. of methanol was treated with an excess of methanolic ammonia at a temperature of about 0° C. for 2 hours. Methanol was then removed under reduced pressure and the residue triturated several times with dry ether to give 4,4'-bis-(α,β-diethylstilbene)-hydroxy-α-butyric acid amide.

EXAMPLE 7

A solution of 13.5 g. of hexestrol in 80 cc. of dry ethanol was treated with 19.5 g. of α-bromoethyl butyrate in the presence of sodium ethoxide as in Example 1 to give 4,4'-bis-(α,β-diethyldiphenylethane)hydroxy-α-butyric acid diethyl ester. The compound was hydrolized in aqueous-ethanol solution and converted to the di-sodium salt of the free acid. The aqueous solution of the salt was acidified to Congo red with concentrated hydrochloric acid and the precipitate separated and crystallized from dilute acetic acid. 4,4'-bis(α,β-diethyldiphenylethane)hydroxy-α-butyric acid was obtained with 65% yield at melting point 215–217° C.

*Analysis.*—Calc. for $C_{26}H_{34}O_6$: C, 70.56; H, 7.75. Found: C, 69.95; H, 7.70.

EXAMPLE 8

By condensing α-bromoethylvalerate with diethylstilbestrol as in Example 1, 4,4'-bis-(α,β-diethylstilbene)-hydroxy-α-valeric acid diethyl ester was obtained and hydrolyzed to the corresponding free acid.

Analogously, 4,4'-bis-(α,β-diethylstilbene)-hydroxy α-caproic acid was prepared.

EXAMPLE 9

In the same manner as in Example 1, diethylstilbestrol was condensed with α-bromo ethyl isocaproate to give 4,4'-bis-(α,β-diethylstilbene)-hydroxy α-isocaproic acid diethylester. This latter gave, by hydrolysis in an aqueous alkaline medium followed by acidification, the corresponding 4,4'-bis-(α,β-diethylstilbene)-hydroxy-α-isocaproic acid melting at 121–124° C.

*Analysis.*—Calc. for $C_{30}H_{40}O_6$: C, 73.25; H, 8.45. Found: C, 72.95; H, 8.30.

EXAMPLE 10

Following the same procedure as in Example 4 and substituting α-bromoethylisocaproate for α-bromoethylpropionate there was obtained 4,4'-bis(α,β-diethyldiphenylethane) hydroxy α-isocaproic acid melting at 145–148° C.

*Analysis.*—Calc. for $C_{30}H_{42}O_6$: C, 72.97; H, 8.80. Found: C, 73.08; H, 8.62.

2 g. of the acid dissolved in 25 cc. of ether were treated with 20 cc. of 12% aqueous sodium hydroxide solution as in Example 2 to give di-sodium 4,4'-bis-(α,β-diethyldiphenylethane) hydroxy α-isocaproate.

EXAMPLE 11

In the same manner as in Example 4, 4,4'-bis-(α,β-diethyldiphenylethane) hydroxy α-caproic acid was obtained from hexestrol and α-bromoethylcaproate.

Analogously, hexestrol was reacted with α-bromoethyl oenanthate to give 4,4'-bis-(α,β-diethyldiphenylethane) hydroxy α-oenanthic acid.

EXAMPLE 12

1.8 g. of 4,4'-bis-(α,β-diethyldiphenylethane) hydroxy α-propionic acid, prepared as in Example 4, were refluxed for three hours with an excess of dry propanol in the presence of 3% sulfuric acid. The mixture after cooling was diluted with water and extracted with ether. The ethereal extract was washed several times with an aqueous 10% sodium hydroxide solution, then with water until neutral, dried over sodium sulfate and the solvent eliminated. 4,4'-bis-(α,β-diethyldiphenylethane) hydroxy α-propionic acid dipropylester was obtained as an oil.

Similarly, the corresponding dimethylester was prepared and converted to 4,4'-bis-(α,β-diethyldiphenylethane) hydroxy-α-propionic acid amide, according to the procedure given in Example 6.

EXAMPLE 13

In the same manner as in Example 4, hexestrol was reacted with α-bromoethylvinylacetate to give 4,4'-bis-(α,β-diethyldiphenylethane) hydroxy-α-vinylacetic acid.

EXAMPLE 14.—PHARMACOLOGICAL TESTING

The capacity of lowering high blood levels of lipids and cholesterol was tested in rats where hyperlipaemia and hypercholesterolaemia were induced by administration of Triton W.R. 1339, according to M. Friedman and S. O. Byers (J. Exp. Med. 97, 117, 1953). Male rats weighing approximately 250 g. each fasting since 24 hours were injected intravenously with 200 mg./kg. of Triton.

Eighteen hours after injection the animals were sacrificed. Blood levels of cholesterol were determined according to D. M. Colman and A.F. McPhee (J. Am. Clin. Pathol. 26, 185, 1956) and that of total lipids according to J. H. Bragdon (J. Biol. Chem. 190, 513, 1951).

The substances under examination were always given by oral route, at equimolecular doses, immediately after injection of Triton.

In the Table I are reported the results obtained in the determination of serium cholesterol levels. Table II summarizes the effects on serum lipids with the test compounds. Hexestrol and diethylstilbestrol given at the same conditions had no significant effect.

*Table I*

| Treatment | Dose 0.0003 M, mg. pro kilo | No. of rats | Blood cholesterol, mg./100 cc. | Change, percent |
|---|---|---|---|---|
| Controls | | 8 | 215.7 | |
| 4,4' bis-($\alpha,\beta$-diethylstilbene) hydroxy $\alpha$-propionic acid | 123.72 | 8 | 158.2 | −26.6 |
| 4,4' bis-($\alpha,\beta$-diethylstilbene) hydroxy $\alpha$-butyric acid | 132.15 | 8 | 156.8 | −27.3 |
| 4,4' bis-($\alpha,\beta$-diethylstilbene) hydroxy $\alpha$-isocaproic acid | 157.2 | 8 | 121.7 | −43.1 |
| 4,4'-bis-($\alpha,\beta$-diethyldiphenyl-ethane)-hydroxy $\alpha$-propionic acid | 124.32 | 8 | 161.3 | −25.2 |
| 4,4' bis-($\alpha,\beta$-diethyldiphenyl-ethane)-hydroxy $\alpha$-butyric acid | 132.75 | 8 | 142.4 | −33.9 |
| 4,4'-bis-($\alpha,\beta$-diethyldiphenyl-ethane)-hydroxy $\alpha$-isocaproic acid | 157.8 | 8 | 161.3 | −25.2 |

*Table II*

| Treatment | Dose 0.0003 M, mg. pro kilo | No. of rats | Blood total lipids, mg./100 cc. | Change percent |
|---|---|---|---|---|
| Controls | | 8 | 1,352 | |
| 4,4'-bis-($\alpha,\beta$-diethylstilbene) hydroxy $\alpha$-propionic acid | 123.72 | 8 | 1,018 | −24.7 |
| 4,4'-bis-($\alpha,\beta$-diethylstilbene) hydroxy $\alpha$-butyric acid | 132.15 | 8 | 1,406 | +3.9 |
| 4,4'-bis-($\alpha,\beta$-diethylstilbene) hydroxy $\alpha$-isocaproic acid | 157.2 | 8 | 811 | −40.0 |
| 4,4'-bis-($\alpha,\beta$-diethyldiphenyl ethane)-hydroxy $\alpha$-propionic acid | 124.32 | 8 | 770 | −43.0 |
| 4,4'-bis-($\alpha,\beta$-diethyldiphenyl ethane)-hydroxy $\alpha$-butyric acid | 132.75 | 8 | 938 | −30.6 |
| 4,4'-bis-($\alpha,\beta$-diethyldiphenyl-ethane)-hydroxy $\alpha$-isocaproic acid | 157.8 | 8 | 1,185 | −12.3 |

In order to estimate the estrogenic activity of the tested compounds, the procedure described by Lawson and Coworkers (End. 24, 35; 1939) was followed. According to this test, 22–23 days aged female rats weighing approximately 30 g. each were injected for three days uninterruptedly, and twice in a day intramuscularly, with 0.5 cc. of an aqueous solution of the estrogen under examination. The animals were sacrificed on the fourth day. Uterus weight was taken into consideration.

The animals received per os, twice in a day and for 3 days long, 0.2 cc. of a 50% alcoholic solution containing the substance under examination. The controls received per os the same volume of the 50% alcohol.

From the experimental date summarized in the Table III it appears that the present derivatives of diethylstilbestrol and hexestrol do not possess the typical action of estrogens even at very high doses while they show a clear activity both as hypocholesterinemic and hypolipaemic agents.

*Table III*

| Treatment | Mg. pro kilo | Uterus, mg./100 g. weight |
|---|---|---|
| Controls | | 64.3 |
| Diethylstilbestrol | 0.1 | 249.3 |
| 4,4'-bis-($\alpha,\beta$-diethylstilbene)-hydroxy $\alpha$-propionic acid | 3.33 | 54.6 |
| | 16.66 | 71.6 |
| 4,4'-bis-($\alpha,\beta$-diethylstilbene)-hydroxy $\alpha$-butyric acid | 3.33 | 62.3 |
| | 16.66 | 61.0 |
| | 33.33 | 69.6 |
| Hexestrol | 0.16 | 128.0 |
| 4,4'-bis-($\alpha,\beta$-diethyldiphenyl-ethane)-hydroxy $\alpha$-propionic acid | 33.33 | 60.5 |
| | 166.66 | 65.3 |
| 4,4'-bis-($\alpha,\beta$-diethyldiphenylethane)-hydroxy $\alpha$-butyric acid | 33.33 | 58.3 |
| | 166.66 | 70.5 |

This application is a continuation-in-part of application Serial No. 751,606 filed July 29, 1958, now abandoned.

What is claimed is:

1. A chemical compound selected from the group consisting of (1) a compound of the formula:

HOOC—HC—O—⟨phenyl⟩—X—⟨phenyl⟩—O—CH—COOH
      |                                               |
      R'                                           R in which X is selected from the group consisting of $$\begin{array}{c} C_2H_5 \\ | \\ C{=}C \\ | \\ C_2H_5 \end{array}$$

and $$\begin{array}{cc} CH\!\!-\!\!-\!\!CH \\ | \quad\quad | \\ C_2H_5 \quad C_2H_5 \end{array}$$

and R and R' each represents a lower hydrocarbon radical and (2) a salt thereof selected from the group consisting of alkali metal and alkaline earth metal salts.

2. 4,4'-bis-($\alpha,\beta$-diethylstilbene)hydroxy $\alpha$-propionic acid.

3. 4,4'-bis-($\alpha,\beta$-diethylstilbene)hydroxy $\alpha$-butyric acid.

4. 4,4'-bis-($\alpha,\beta$-diethylstilbene)hydroxy $\alpha$-isocaproic acid.

5. 4,4'-bis-($\alpha,\beta$-diethyldiphenylethane)hydroxy $\alpha$-propionic acid.

6. 4,4'-bis-($\alpha,\beta$-diethyldiphenylethane)hydroxy $\alpha$-butyric acid.

References Cited by the Examiner

Hager et al.: Chemical Abstracts, vol. 41, page 744 (1947).

Dodds et al.: Proc. Royal Society London, vol. 140B, pages 470–2 (1953).

Carrara et al.: Farm. Scietec (Pavia), vol. 6, pages 444–7 (1951).

LORRAINE A. WEINBERGER, *Acting Primary Examiner*.

CHARLES B. PARKER, LEON ZITVER, *Examiners*.